(12) United States Patent
Fukuda

(10) Patent No.: US 6,389,916 B1
(45) Date of Patent: May 21, 2002

(54) CONTROL DEVICE FOR SYNCHROMESH AUTOMATIC TRANSMISSION

(75) Inventor: Takehisa Fukuda, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 6 days.

(21) Appl. No.: 09/639,926

(22) Filed: Aug. 17, 2000

(30) Foreign Application Priority Data

Apr. 28, 2000 (JP) ........................................ 2000-129929

(51) Int. Cl.[7] .............................................. F16H 59/00
(52) U.S. Cl. ....................................................... 74/335
(58) Field of Search ............................... 74/335, 336 R

(56) References Cited

U.S. PATENT DOCUMENTS

| | | | | |
|---|---|---|---|---|
| 4,766,774 A | * | 8/1988 | Tami ............................ 74/745 |
| 4,847,767 A | * | 7/1989 | Carton et al. ............. 364/424.1 |
| 4,856,360 A | * | 8/1989 | Yoshimura et al. ........... 74/335 |
| 4,911,031 A | * | 3/1990 | Yoshimura et al. ........... 74/335 |

FOREIGN PATENT DOCUMENTS

| | | |
|---|---|---|
| DE | 197 31 842 | 1/1998 |
| GB | 2 315 526 | 2/1998 |
| JP | 63-270252 | 11/1988 |

* cited by examiner

Primary Examiner—Dirk Wright
(74) Attorney, Agent, or Firm—Sughrue Mion, PLLC

(57) ABSTRACT

A control device for a synchromesh automatic transmission comprising an input shaft 13 coupled to a crank shaft 1a of a combustion engine 1 by a clutch 2, an output shaft 16 coupled to the input shaft 13 by gears, a plurality of groups of transmission gears located between the output shaft 16 and the input shaft 13, sleeve gears selectively coupling one of the groups of the transmission gears to the output shaft 16, a shifting and selecting actuator 5 operating the sleeve gears 22, a shifting and selecting position sensor 6 detecting operating positions by the shifting and selecting actuator 5, and a control unit controlling a control input to the shifting and selecting actuator 5, wherein the control unit corrects a next target control input using a deviation between an actual control input to the shifting and selecting actuator 5 and a target control input as a learning value, whereby a shifting operation is constantly conducted within a short time even though a shifting quantity is changed by an aged deterioration and a scattering.

4 Claims, 5 Drawing Sheets

CONTROL DEVICE FOR SYNCHROMESH AUTOMATIC TRANSMISSION

BACKGROUND OF THE INVENTION

1. Field of the Invention

The present invention relates to a control device for a synchromesh automatic transmission for a vehicle, which can stably maintain a time for changing gears.

2. Discussion of Background

An example of a control device for a synchromesh automatic transmission for a vehicle is disclosed in, for example, Japanese Unexamined Patent Publication JP-A-63-270252, wherein an opening degree of a throttle is controlled to maintain a change between a rotational speed of a combustion engine at time of releasing an electromagnetic clutch for changing transmission gears and a rotational speed of the combustion engine at time of recoupling the electromagnetic clutch within a predetermined range, and a control input is corrected by a learning routine at every gear changing operation in order to deal with scattering and various conditions of the combustion engine in a structure of coupling the combustion engine with a synchromesh automatic transmission by the electromagnetic clutch, whereby a shock caused by a gear changing operation is relaxed.

A shifting device changing the gears of the transmission in this conventional technique is constructed such that a pair of three-position oil pressure cylinders operating a shifting and selecting lever in an actual direction and a rotational direction, a shifting rod is selected by driving the three-position oil pressure cylinder for selecting the gears, and the selected shifting rod is moved by driving the three-position oil pressure cylinder for shifting the gears to change gear positions. Other than the hydraulic shifting device, an electromotive synchromesh automatic transmission, by which gears are shifted and selected in use of two motors, is generally used. A gear change operation in this electromotive synchromesh automatic transmission controls a driving quantity of a shifting and selecting actuator using a deviation between a shifting and selecting position detected by a shifting and selecting position sensor and a target shifting and selecting position as a parameter, wherein a feedback control of the positions is performed in use of a PID control, in which proportional elements, integral elements, and differential elements are distinguished.

In the conventional synchromesh automatic transmission changing the gear positions by controlling the shifting and selecting positions, the positions are controlled by setting a value of parameters for the positional feedback control. However, because the parameters are fixed values in the conventional device, there are problems that convergence of an actual shifting position into a target shifting position is deteriorated, a time required for a shifting operation is prolonged to give an uncomfortable feeling to a driver at time of changing the gears, and a drive feeling is deteriorated when a control input, necessary for a shifting operation, is changed by scattering of accuracies of components, changes of conditions in use, aged deterioration, and so on.

SUMMARY OF THE INVENTION

It is an object of the present invention to solve the above-mentioned problems inherent in the conventional technique and to provide a control device for a synchromesh automatic transmission which renews controlling parameters by each operation based on an learning value of deviation, obtained from a deviation between a target shifting position and an actual shifting position and a shifting time, and shifting is succeedingly controlled by thus renewed parameters to enable a shifting operation constantly within a short time even though driving quantity necessary for the shifting operation is varied.

According to a first aspect of the present invention, there is provided a control device for a synchromesh automatic transmission comprising: an input shaft coupled to a crank shaft of a combustion engine through a clutch mechanism; an output shaft coupled to the input shaft by gears; a plurality of groups of transmission gears having different gear ratios and interposed between the input shaft and the output shaft; a coupling mechanism selectively coupling one of the plurality of groups of the transmission gears and the output shaft; a shifting and selecting actuator controlling a shifting position and a selecting position of the coupling mechanism; a shifting and selecting position sensor detecting a position controlled by the shifting and selecting actuator; and a control unit controlling a control input for the shifting and selecting actuator by a feedback of a position detected by the shifting and selecting position sensor, wherein the control unit detects a deviation between an actual control input by the shifting and selecting actuator and a target control input, and a next target control input is corrected using a quantity of the deviation as a learning value.

According to a second aspect of the present invention, there is provided the control device for the synchromesh automatic transmission, wherein the control unit detects the deviation between the actual control input of the shifting and selecting actuator and the target control input, and a lapse of time for changing the gears, and a next target control input is corrected based on the deviation and the lapse of time.

According to a third aspect of the present invention, there is provided the control device for the synchromesh automatic transmission, wherein the shifting and selecting actuator is controlled by a positional control by a PID control, and the target control input is corrected by proportional elements in the PID control.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 6 as follows, wherein the same numerical references are used for the same or similar portions and descriptions of these portions is omitted.

Embodiment 1

Figure 1:
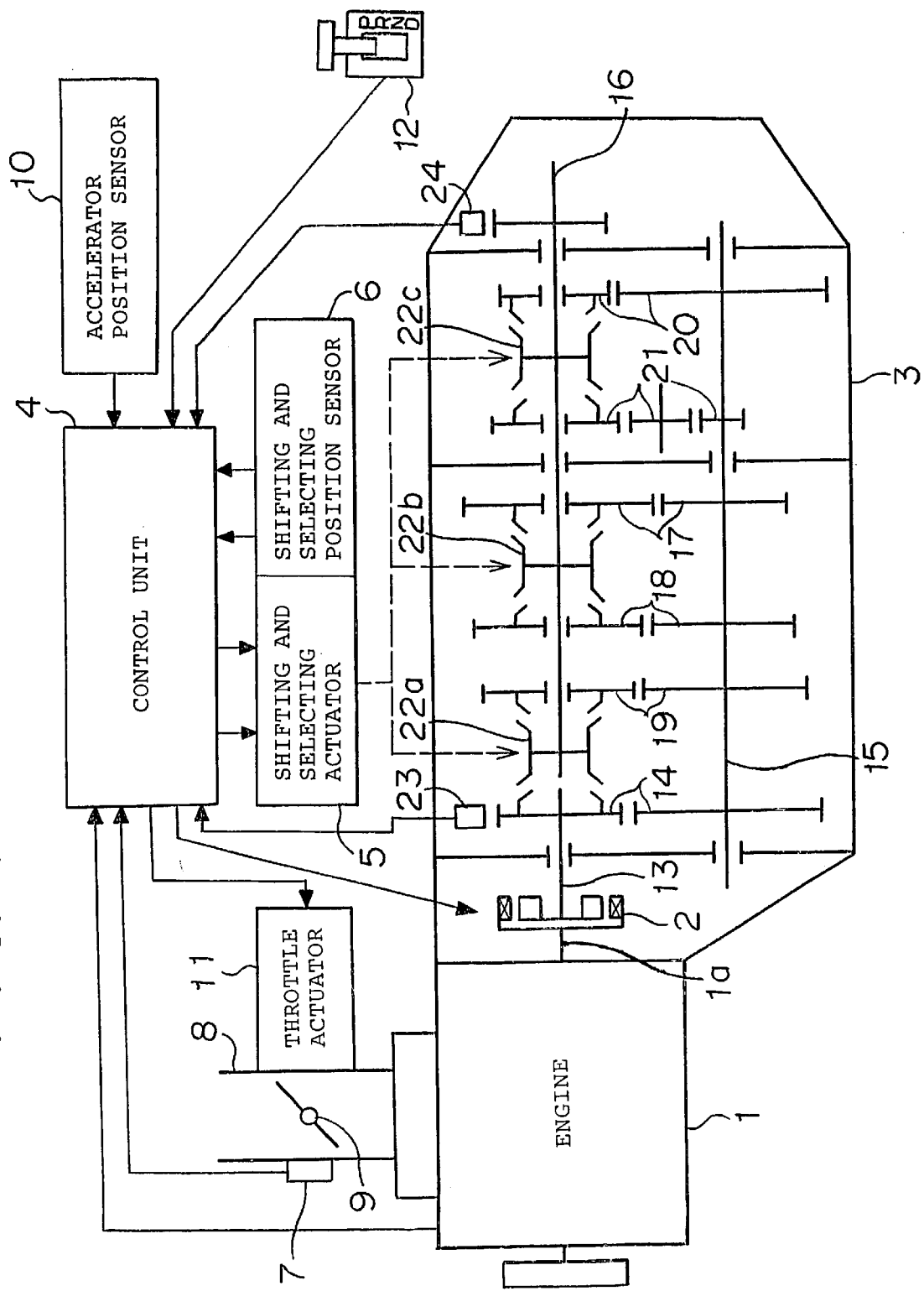
FIG. 1 is a block chart illustrating a structure of a control device for a synchromesh automatic transmission according to Embodiment 1 of the present invention.
Figure 2:
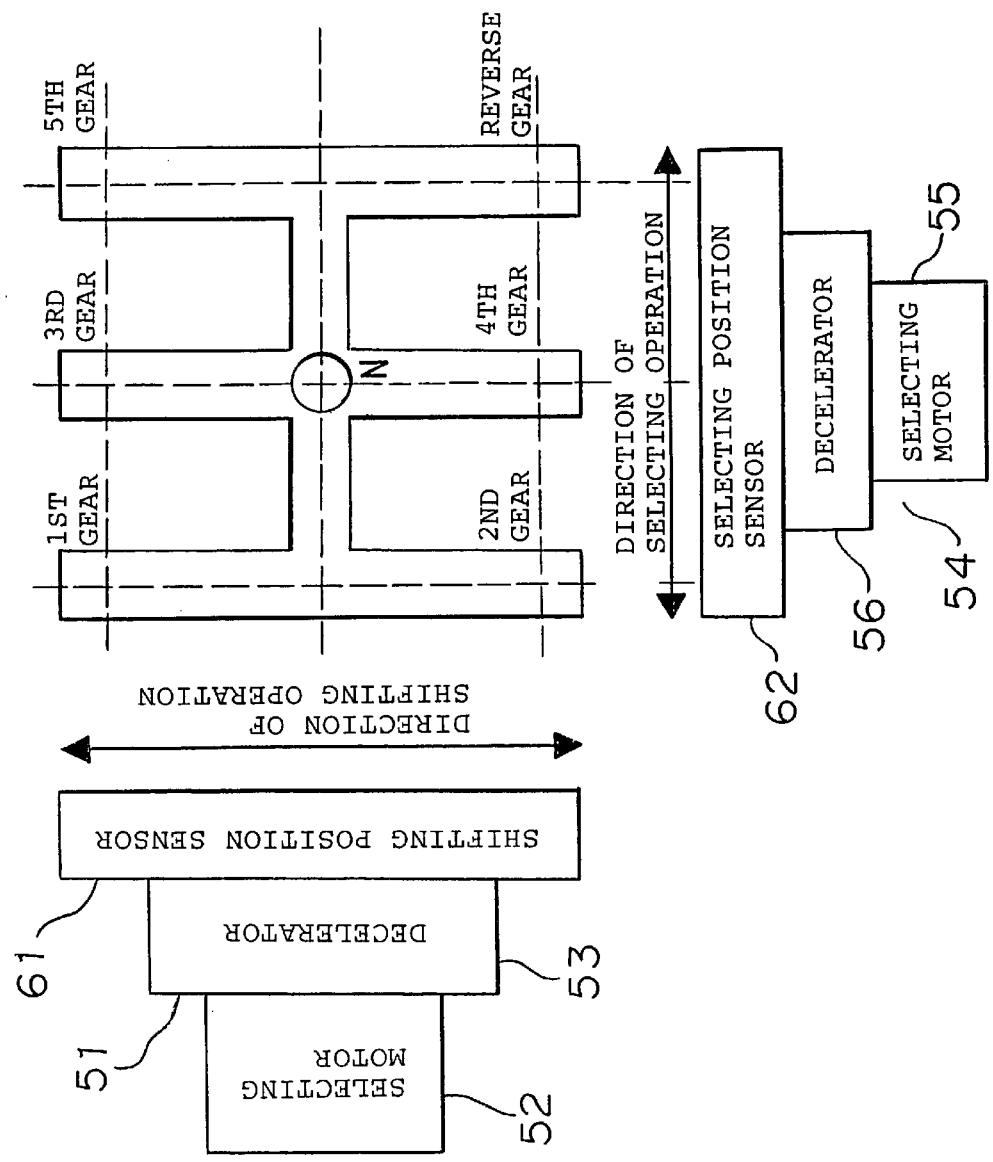
FIG. 2 illustrates a structure of a transmission of the control device for the synchromesh automatic transmission according to Embodiment 1 of the present invention.
Figure 3:
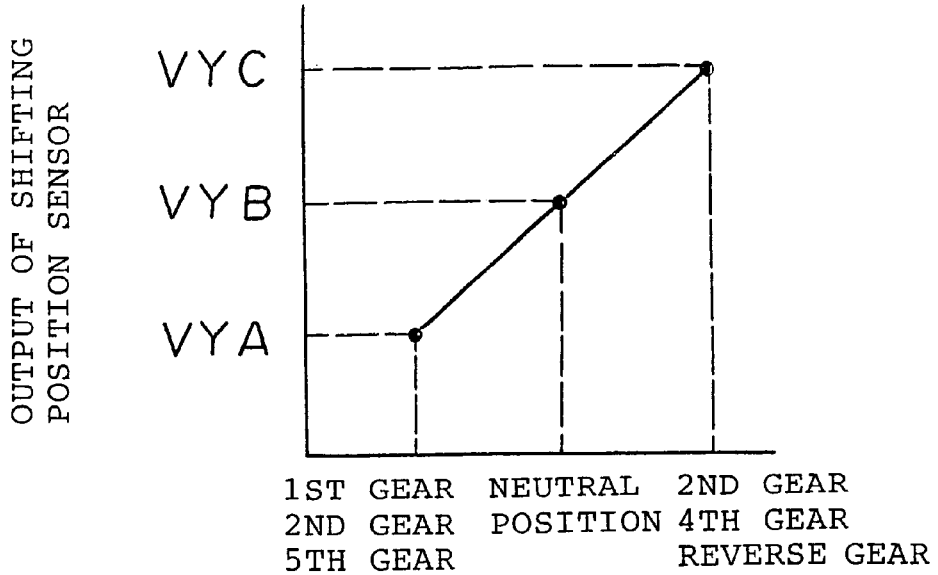
FIG. 3 is a graph illustrating an operation of the control device for the synchromesh automatic transmission according to Embodiment 1 of the present invention.
Figure 4:
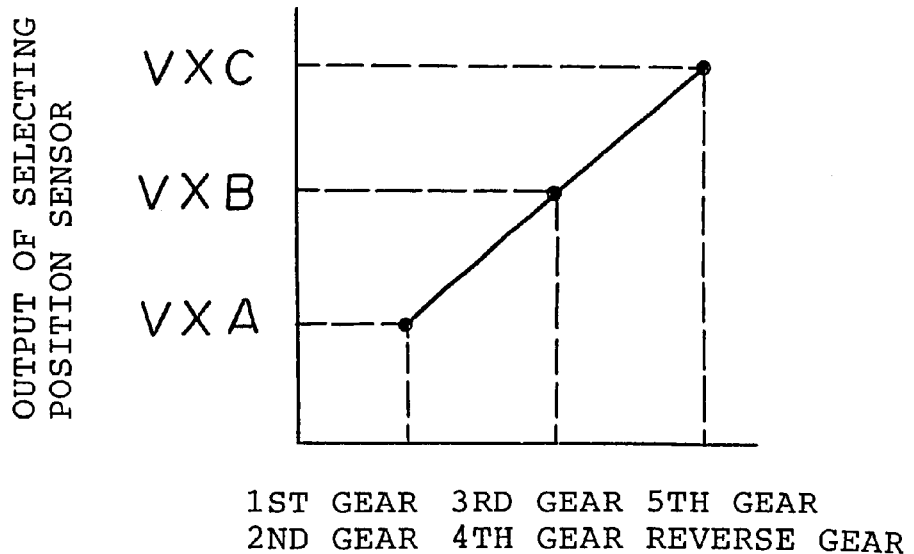
FIG. 4 is a graph illustrating an operation of the control device for the synchromesh automatic transmission according to Embodiment 1 of the present invention.
Figure 5:
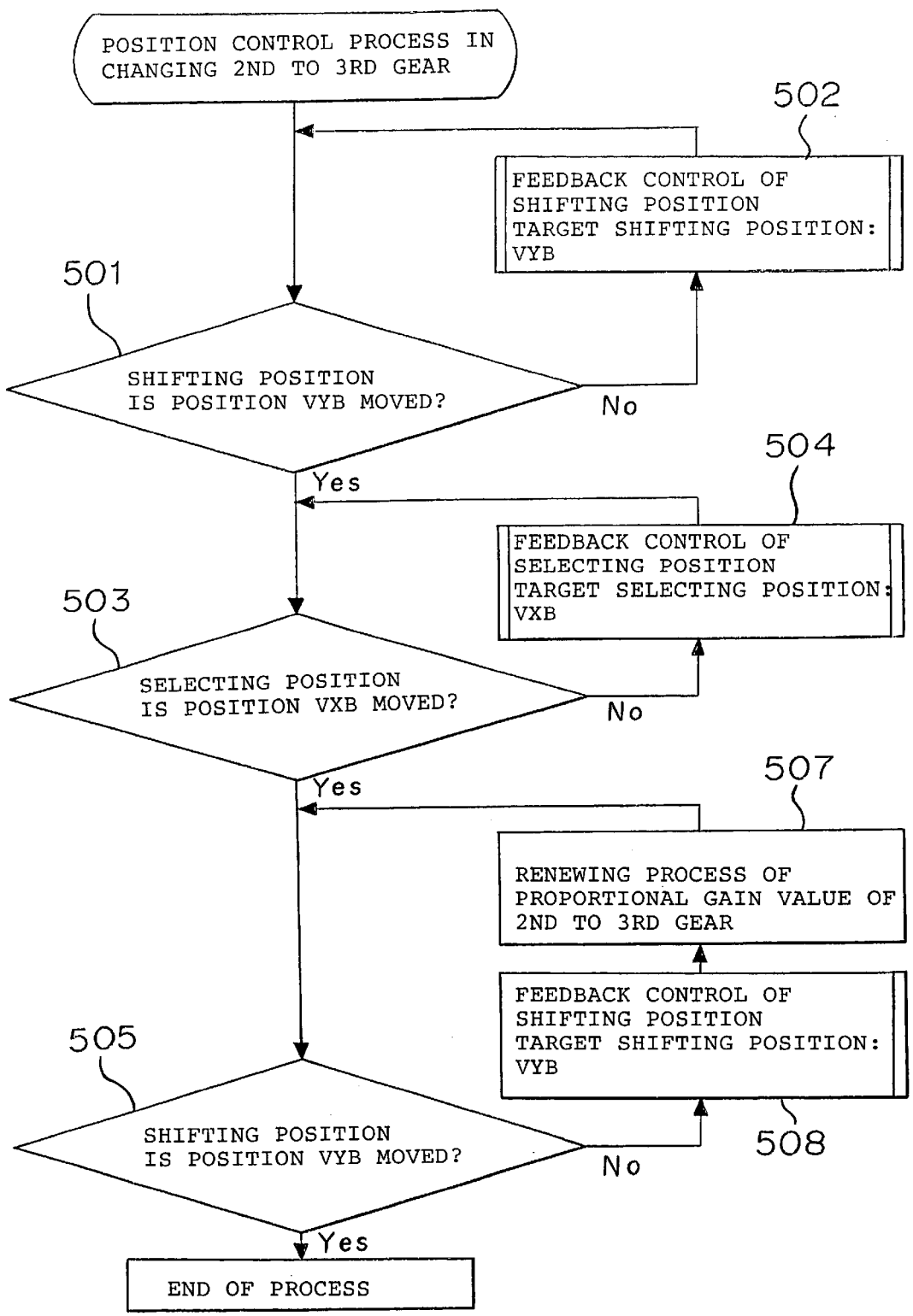
FIG. 5 is a flow chart illustrating an operation of the control device for the synchromesh automatic transmission according to Embodiment 1 of the present invention.
Figure 6:
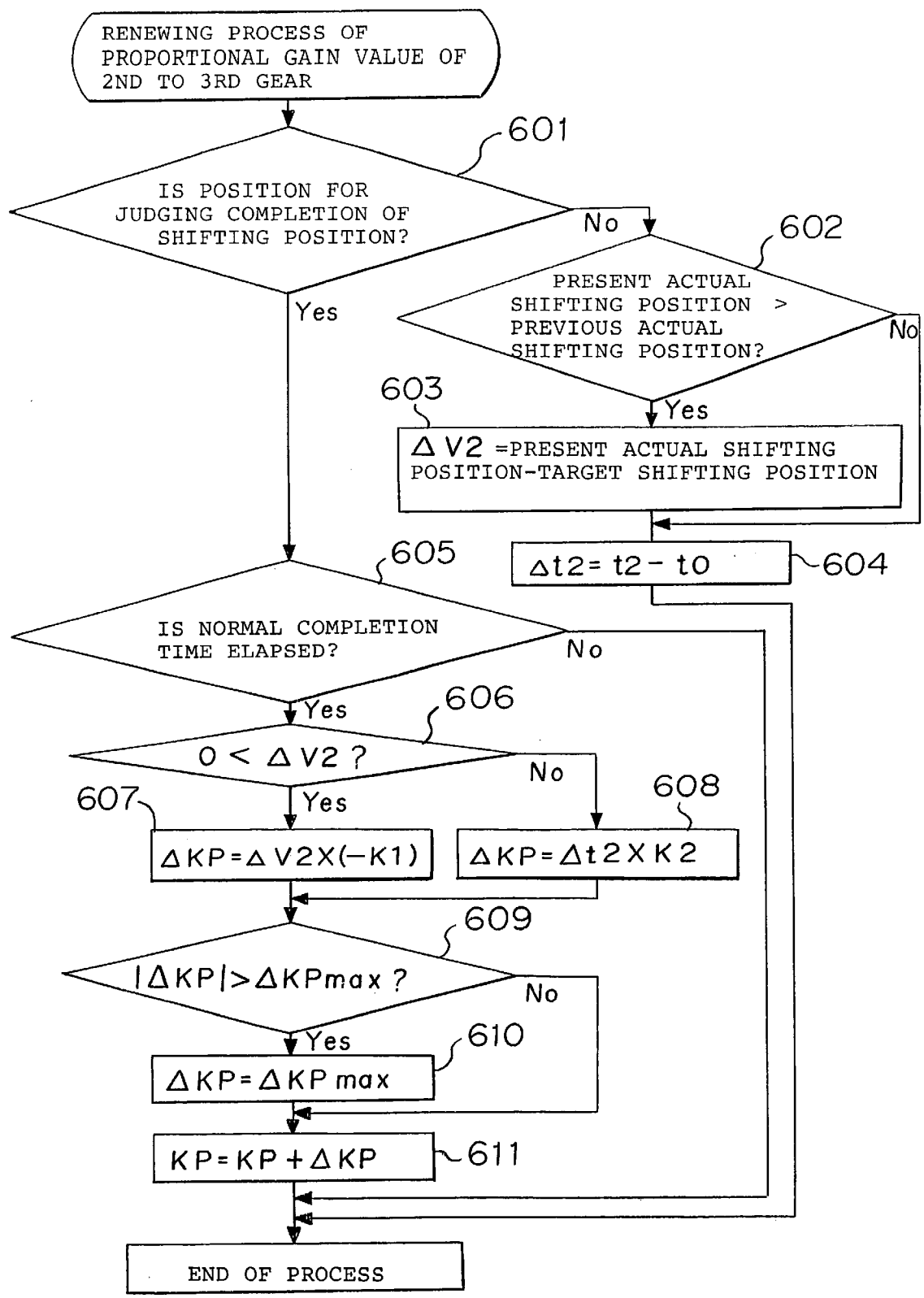
FIG. 6 is a flow chart illustrating an operation of the control device for the synchromesh automatic transmission according to Embodiment 1 of the present invention.

FIGS. 1 through 6 illustrate a structure and an operation of a control device for a synchromesh automatic transmission according to Embodiment 1 of the present invention. FIG. 1 is a block chart illustrating the structure of the transmission. FIG. 2 illustrates the structure of the transmission. FIGS. 3 and 4 are graphs for illustrating an operation. FIGS. 5 and 6 are flow charts illustrating a controlling operation. In FIG. 1, numerical reference 1 designates a combustion engine equipped in a vehicle; numerical reference 2 designates an electromagnetic clutch located in a crank shaft 1a of the combustion engine 1 and coupling the combustion engine 1 with an automatic transmission 3 of a synchromesh type; numerical reference 4 designates a control unit controlling the automatic transmission 3; numerical reference 5 designates a shifting and selecting actuator for engaging gears of the automatic transmission 3 as described below, wherein the shifting and selecting actuator is controlled by the control unit 4. Numerical reference 6 designates a shifting and selecting position sensor, detecting an operating position of the shifting and selecting actuator 5.

Numerical reference 7 designates a throttle position sensor detecting an opening degree of a throttle valve 9 located in an intake passage 8 of the combustion engine 1. Numerical reference 10 designates an accelerator position sensor detecting an amount of applying an accelerator pedal (not shown). Numerical reference 11 designates a throttle actuator, driven by the control unit 4 based on a predetermined program at time of changing the gears to operate an opening degree of the throttle valve 9. Numerical reference 12 designates a shifting lever instructing a shifting position by a driver to the control unit 4.

The automatic transmission 3 comprises an input shaft 13 coupled to the electromagnetic clutch 2, a counter shaft 15 coupled with the input shaft 13 by a primary gear set 14, an output shaft 16 driving a vehicle, a first gear set 17 paired and located between the counter shaft 15 and the output shaft 16, a second gear set 18, a third gear set 19, a fifth gear set 20, a reverse gear set 21 and sleeve gears 22a, 22b and 22c, being a coupling mechanism fixed to the output shaft 16 in a rotational direction and movably located in the output shaft 16 in an actual direction. Gears of one of each gear set 17, 18, 19, 20 and 21 on a side of the counter shaft 15 are fixed to the counter shaft 15, and gears on a side of the output shaft are rotatably equipped in the output shaft 16, and individually fixed to the output shaft 16 by engagement with the sleeve gears 22a, 22b and 22c.

Numerical reference 23 designates an input shaft rotational speed sensor detecting a rotational speed of the input shaft 13. Numerical reference 24 designates an output shaft rotational speed sensor detecting a rotational speed of the output shaft 16. The electromagnetic clutch 2 generates a transmitting torque in proportional to an exiting current, and is controlled by the control unit 4 to transfer or disconnect a motive power between the crank shaft 1a of the combustion engine and the input shaft of the automatic transmission 3.

FIG. 2 illustrates a structure of the automatic transmission 3 for explaining a summary of an operation of the automatic transmission 3 by the shifting and selecting actuator 5. The shifting and selecting actuator 5 comprising a shifting actuator 51 and a selecting actuator 54, wherein the shifting actuator 51 comprises a shifting motor 52 and a decelerating mechanism 53. The shifting actuator 51 shifts the sleeve gears 22a, 22b and 22c to three positions of a side of first, third and fifth gears, a neutral position, and a side of second, fourth and reverse gears detecting the shifting position by a shifting position sensor 61. The selecting actuator comprises a selecting motor 55 and a decelerating mechanism 56, wherein the selecting actuator 54 selects the sleeve gears 22a, 22b and 22c detecting a selecting position by the selecting position sensor 62.

The gear sets 17, 18, 19 and 20 of the automatic transmission 3 are for a forward driving. Each of the gear sets 17, 18, 19 and 20 have different gear ratios. In Embodiment 1, a case of five positions of the forward driving and one position of a reverse driving is described. The sleeve gears 22a, 22b and 22c individually fixing the gear sets 17, 18, 19, 20 and 21 to the output shaft 16 are positioned as follows. The sleeve gear 22a is located between the primary gear set 14 and the third gear set 19. The sleeve gear 22b is located between the first gear set 17 and the second gear set 18. The sleeve gear 22c is positioned between the fifth gear set 20 and the reverse gear set 21. One of the sleeve gears 22a, 22b and 22c is selected by the selecting actuator 54, and the one is transferred to either side by the shifting actuator 51 to select one of the forward gears of the first through fifth gears, the reverse gear, or the neutral position. In FIG. 1, the fourth gear is selected by coupling the primary gear set 14 with the output shaft 13.

FIG. 3 illustrates a relationship between the shifting position of the shifting position sensor 61 and an output voltage. FIG. 4 illustrates a relationship between the selecting position of the selecting position sensor 64 and an output voltage. The shifting position sensor 61 outputs a voltage VYA when the sleeve gear 22a, 22b or 22c is positioned on the side of the first, third and fifth gears, wherein the voltage VYA is a target position voltage at time of controlling shifting by the control unit 4. In a similar manner thereto, the voltage VYB is the output voltage from the shifting position sensor 61 when the sleeve gear 22a, 22b or 22c is on the side of the first, third or fifth gear, wherein the voltage VYA is a target position voltage at time of shifting to control the voltage VYB. Further, when the sleeve gear 22a, 22b or 22c is on the side of the second, fourth and the reverse gear, a voltage VYC is an output voltage from the shifting position sensor 61, wherein the output voltage is a target position voltage at time of shifting. Further, in the selecting position sensor 64, an output, i.e. a target position voltage, at time of selecting the sleeve gear 22c for switching the fifth gear and the reverse gear are VXC. An output, i.e. a target position voltage, at time of selecting the sleeve gear 22a for switching the third or fourth gear is a voltage of VXB. An output, i.e. a target position voltage, at time of selecting the sleeve gear 22b for switching the first or second gear is a voltage of VXA.

The gear changing operation by the control unit 4 is performed such that a position signal of the shifting lever 12, a signal of the accelerator position sensor, rotational speed signals from the input shaft rotational speed sensor 23 and the output shaft rotational speed sensor 24, and a rotational speed signal of the combustion engine are inputted in the control unit 4; a gear position suitable for a driving condition is determined by a shifting pattern memorized in the control unit 4; and the shifting and selecting actuator 5 is operated while the shifting and selecting positions are detected by the shifting and selecting sensor 6.

The gear changing operation is as follows. At first, the exiting current to the electromagnetic clutch 2 is turned off to cut a power to the automatic transmission 3 off. The sleeve gear 22a, 22b or 22c is selected by applying the instruction of the operation to the shifting and selecting actuator 5, and the gear set of a determined gear position is coupled after releasing a present coupling of the gear sets. When a completion of the coupling is detected by the shifting and selecting position sensor 6, the electromagnetic clutch 2 is recoupled. In the meantime, the throttle actuator 11 is operated at time of turning-off the electromagnetic clutch, the throttle valve 9 is choked. At time of recoupling the electromagnetic clutch 2, the throttle valve 9 is opened to a predetermined position based on the rotational speed of the combustion engine and the output signal from the output shaft rotational speed sensor 24.

In the control device for the synchromesh automatic transmission according to Embodiment 1 having the above-described structure and operation, the control unit 4 controls the gear positions illustrated in the flow chart of FIG. 5. Hereinbelow, an example of the operation of shifting the second gear to the third gear will be described. When the control unit 4 judges that a driving condition is suitable for the third gear when a vehicle is driving at the second gear, it is judged whether or not the shifting position is transferred to the neutral position in Step 501 by detecting whether or not the voltage of the shifting position sensor 61 is VYB. If the shifting position is not transferred to the neutral position, a feedback control is performed to transfer the shifting position to the neutral position in Step 502. Thereafter, Step 501 is processed. If the shifting position is transferred to the neutral position, Step 503 is processed to judge whether or not the selecting position is transferred to the third and fourth position by detecting a selecting position voltage VXB.

If the selecting position is not transferred to the position of the third and fourth gears, a feedback control is performed to transfer the selecting position to the third and fourth position in Step 504. If the transfer of the selecting position is completed, Step 505 is processed. In Step 505, it is judged whether or not the shifting position is completed to transfer on the side of the first, third and fifth gears in view of a shifting position voltage VYA. If the shifting position is not transferred, a feedback control is performed to transfer the shifting position in Step 506. Thereafter, a proportional gain value is renewed in Step 507 as described below. Thereafter, Step 505 is processed to confirm a completion of the transfer of the shifting position, and a shifting operation is completed.

The feedback control of the shifting position is a positional feedback control by a PID control, wherein a control input by the PID control is:

Control input=$KP \times \Delta Vd + KI \times \int \Delta Vd \cdot dt + KV \times d(\Delta Vd)/dt$, where reference KP denotes a proportional gain value; reference KI denotes an integral gain value; reference KV denotes differential gain value; and reference $\Delta Vd$ denotes a deviation between the target shifting position detected by the shifting position sensor and the actual shifting position.

A process of renewing the proportional gain value KP in Step 507 is illustrated in the flow chart of FIG. 6. At first, in Step 601, it is judged whether or not the shifting position obtained by the positional feedback control in Step 505 of the flow chart illustrated in FIG. 5 reaches the target shifting position. If the shifting is not completed, a present shifting position is compared with a previous shifting position in Step 602. If the present shifting position is larger than the previous shifting position, a deviation $\Delta V2$ between these is operated in Step 603. Thus, the deviation from starting of the shifting and finishing of the shifting is operated. Accordingly, in Step 604, an elapsed shifting time $\Delta t2$ is operated from a shifting starting time t0.

When the completion of the shifting is judged in Step 601, Step 605 is processed. In Step 605, it is judged whether or not the elapsed shifting time is within a preset predetermined time. If the elapsed shifting time is within the predetermined time, a normal condition is determined, and the process is finished. If the shifting is not completed within the predetermined time in Step 605, Step 606 is processed to judge whether or not $0<\Delta V2$. If $0<\Delta V2$, a product of the deviation $\Delta V2$ and a coefficient $-k1$ reducing the proportional gain of the deviation is set as a variation of proportional gain $\Delta KP$ in Step 607. Further, when $0>\Delta V2$ in Step 606, Step 608 is processed to set a product of the elapsed shifting time $\Delta t2$ and a coefficient K2 increasing the proportional gain of the shifting time in the variation $\Delta KP$ of the proportional gain.

After setting the variation $\Delta KP$ of the proportional gain, Step 609 is processed. In Step 609, the variation $\Delta KP$ of the proportional gain is compared with the maximum limiting value $\Delta KPmax$ of the variation. If $\Delta KP>\Delta KPmax$, the variation is limited in Step 610 to render the maximum value of the variation $\Delta KP$ of the proportional gain $\Delta KPmax$. In Step 611, the previously set proportional gain KP is renewed by adding the variation $\Delta KP$ of the proportional gain, whereby a new proportional gain KP is obtained.

As described, by renewing the proportional gain value when the predetermined time or more is required in the shifting operation, when the same shifting operation is conducted to shift from the second gear to the third gear, a control is performed using the renewed proportional gain value, whereby the convergence is improved than that in the previous control, the shifting operation is completed within a short time, the uncomfortable feeling at time of changing the gears is avoidable, and a good feeling is obtainable. Although, in Embodiment 1, the electromotive synchromesh automatic transmission is exemplified, the same control is applicable to a hydraulic synchromesh automatic transmission, described in the conventional technique, and an effect similar to those in the conventional technique is obtainable.

The invention provides effects that the shifting operation is conducted constantly within a short time even though the requisite driving quantity at time of the shifting is changed by the scattering of the accuracy of the components, the change of the conditions in use, the aged deterioration, and so on; the uncomfortable feeling can be avoided at time of changing the gears; and the comfortable feeling is obtainable at time of changing the gears.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2000-129929 filed on Apr. 28, 2000 including specification, claims, drawings and summary are incorporated herein by reference in its entirety.

What is claimed is:

1. A control device for a synchromesh automatic transmission comprising:

an input shaft coupled to a crank shaft of a combustion engine through a clutch mechanism;

an output shaft coupled to the input shaft by gears;

a plurality of groups of transmission gears having different gear ratios and interposed between the input shaft and the output shaft;

a coupling mechanism selectively coupling one of the plurality of groups of the transmission gears and the output shaft;

a shifting and selecting actuator controlling a shifting position and a selecting position of the coupling mechanism;

a shifting and selecting position sensor detecting a position controlled by the shifting and selecting actuator; and a control unit controlling a control input for the shifting and selecting actuator by a feedback of a position detected by the shifting and selecting position sensor, wherein the control unit detects a deviation between an actual control input of the shifting and selecting actuator and a target control input, and a lapse of time for changing the gears, and a next target control input is corrected based on the deviation and the lapse of time, using a quantity of the deviation as a learning value.

2. A control device for a synchromesh automatic transmission comprising:

an input shaft coupled to a crank shaft of a combustion engine through a clutch mechanism;

an output shaft coupled to the input shaft by gears;

a plurality of groups of transmission gears having different gear ratios and interposed between the input shaft and the output shaft;

a coupling mechanism selectively coupling one of the plurality of groups of the transmission gears and the output shaft;

a shifting and selecting actuator controlling a shifting position and a selecting position of the coupling mechanism;

a shifting and selecting position sensor detecting a position controlled by the shifting and selecting actuator; and a control unit controlling a control input for the shifting and selecting actuator by a feedback of a position detected by the shifting and selecting position sensor, wherein the control unit detects a deviation between an actual control input by the shifting and selecting actuator and a target control input, a next target control input is corrected using a quantity of the deviation as a learning value, the shifting and selecting actuator is controlled by a positional control by a PID control, and the target control input is corrected by proportional elements in the PID control.

3. The control device for the synchromesh automatic transmission according to claim 1, wherein the shifting and selecting actuator is controlled by a positional control by a PID control, and the target control input is corrected by proportional elements in the PID control.

4. The control device for the synchromesh automatic transmission according to claim 2, wherein the shifting and selecting actuator is controlled by a positional control by a PID control, and the target control input is corrected by proportional elements in the PID control.

* * * * *